July 10, 1956
M. D. BROWN
2,753,780
SOIL PULVERIZER AND ROOT SEPARATOR
Filed Dec. 26, 1951
2 Sheets-Sheet 1
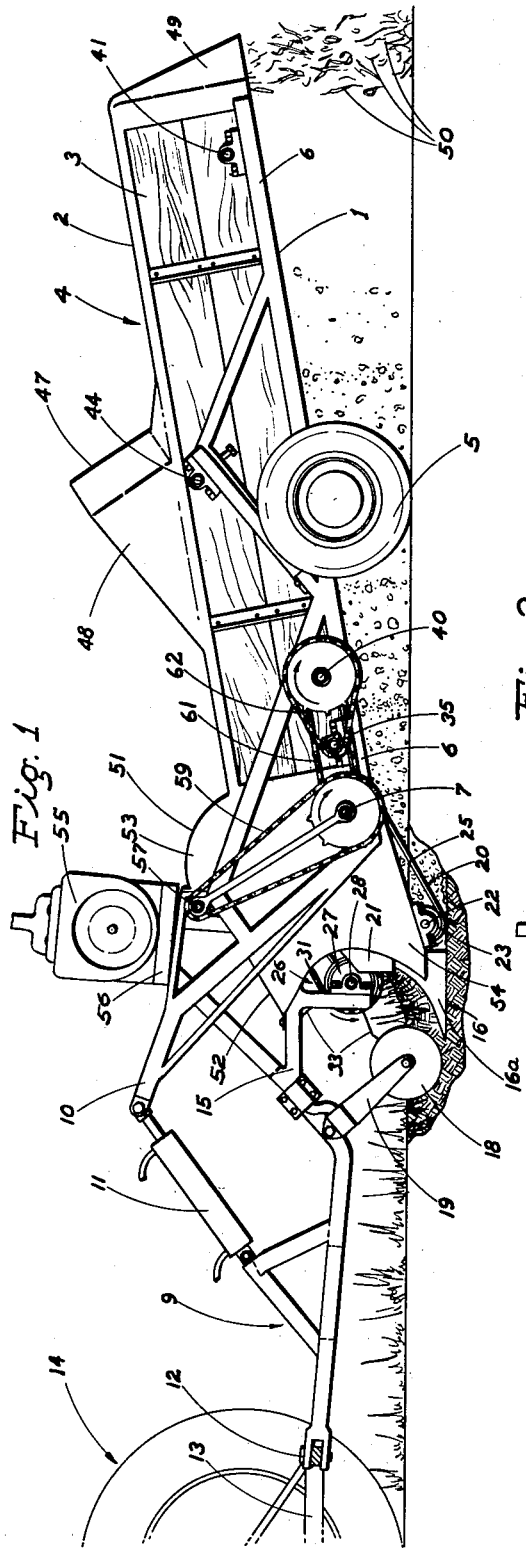
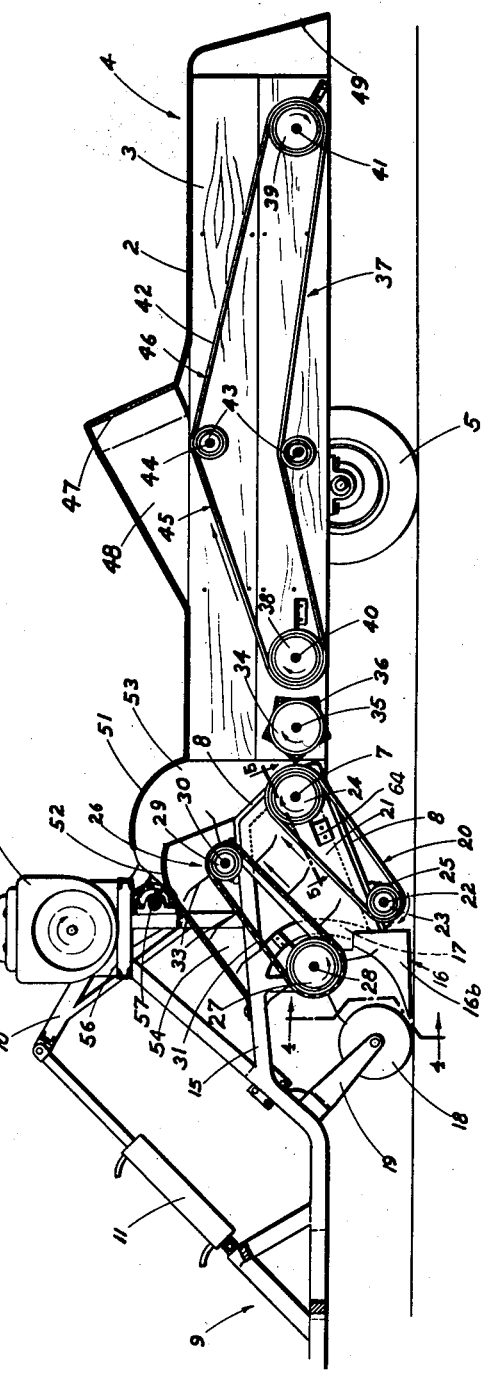
INVENTOR
Marvin D. Brown
BY *Webster & Webster*
ATTORNEYS July 10, 1956  M. D. BROWN  2,753,780
SOIL PULVERIZER AND ROOT SEPARATOR
Filed Dec. 26, 1951  2 Sheets-Sheet 2
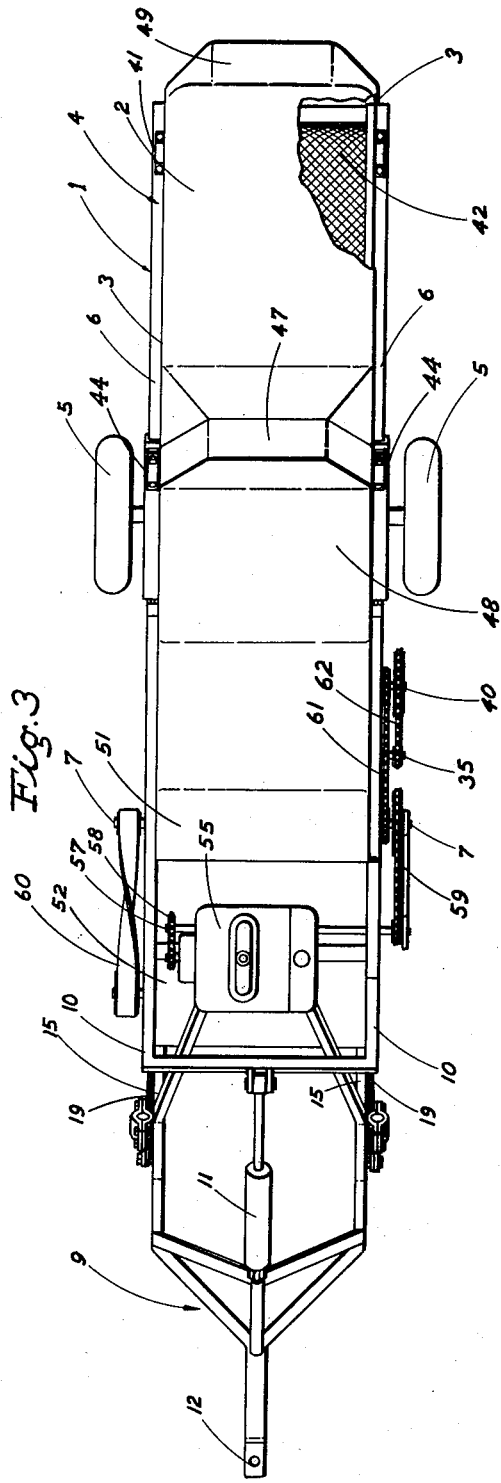
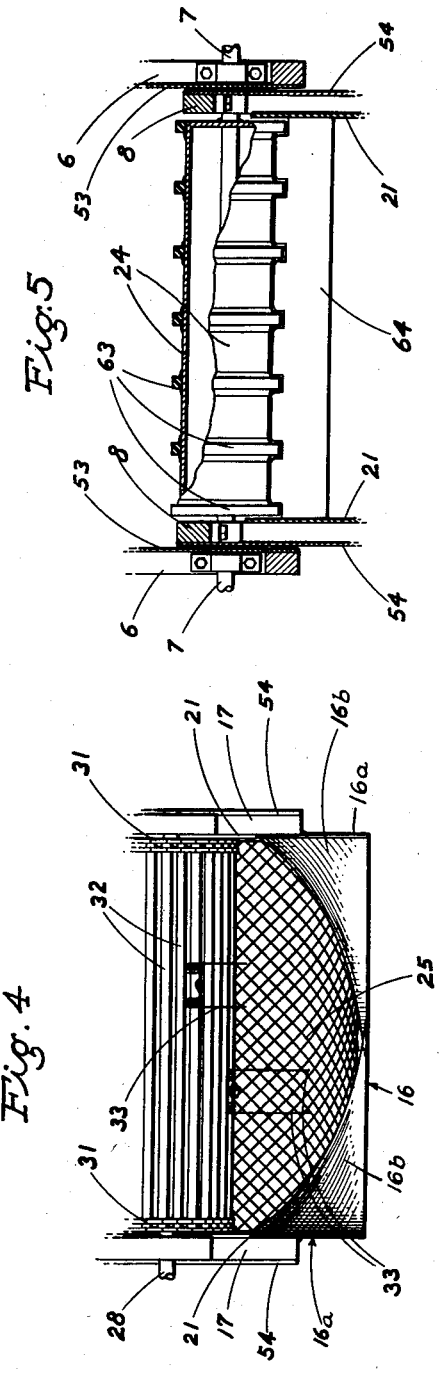
INVENTOR
Marvin D. Brown
BY *Webster & Webster*
ATTORNEYS

United States Patent Office 2,753,780
Patented July 10, 1956

2,753,780

SOIL PULVERIZER AND ROOT SEPARATOR

Marvin D. Brown, Turlock, Calif.

Application December 26, 1951, Serial No. 263,371

2 Claims. (Cl. 97—10)

The present invention relates in general to a farm implement.

In particular, the invention is directed to, and it is a major object to provide, an implement adapted to plow and pulverize the soil, while separating undesirable matter such as the roots of noxious grasses, as—for example —Bermuda grass, Johnson grass, quack grass, and morning glory. The implement also is useful to separate sticks, stones, or other foreign material from the soil; or the implement may be used to harvest root crops such as potatoes.

Another important object of the invention is to provide an implement, for pulverizing the soil and separating undesirable matter, which embodies a novel plow and power-driven conveyor assembly; there being a plurality of conveyors arranged in a manner to loosen the soil, sift it back onto the ground free from such undesirable matter, and conveying the latter for subsequent deposit atop the ground in a windrow. An additional object of the invention is to provide a soil pulverizer and separator for the purpose described, which embodies a novel articulated, power actuated frame structure arranged for adjustment whereby the plows and adjacent conveyor parts can be selectively disposed in a lowered working position, or a raised position for turning in the field or road transport.

A further object of the invention is to provide a soil pulverizer and separator which does not leave a dead furrow, or cause any substantial unleveling of the land worked by said implement.

It is also an object of the invention to provide a soil pulverizer and separator which is simple but rugged in structure; is designed for ease and economy of manufacture; and requires a minimum of servicing, maintenance, or repair when in use.

Still an additional object of the invention is to provide a practical and reliable soil pulverizer and root separator, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the novel implement as in use.

Fig. 2 is a sectional elevation of the implement in raised position, and with the near plow detached.

Fig. 3 is a plan view of the implement.

Fig. 4 is an enlarged fragmentary cross section on line 4—4 of Fig. 2.

Fig. 5 is an enlarged fragmentary cross section on line 5—5 of Fig. 2

Referring now more particularly to the characters of reference on the drawings, the implement comprises an elongated main frame 1, of box construction, fitted with a longitudinal top 2 and sides 3, whereby to form an elongated, tunnel-like housing, indicated generally at 4, which housing is open at the bottom for its full length.

The main frame 1 is supported, intermediate its ends, by transversely spaced, pneumatic-tire wheels 5, while at their forward ends the lower side beams 6 of said frame are pivotally connected to a cross shaft 7, said cross shaft also serving for the pivotal connection of the rear ends of the side beams 8 of a draft frame, indicated generally at 9, which projects ahead of the main frame 1. The manner of pivotally connecting the side beams 6 and 8 with the cross shaft 7 is shown in detail in Fig. 5.

With the main frame 1 and draft frame 9 pivotally connected together in articulated relation, as above, said frames are adapted for up and down hinging adjustment, which is accomplished as follows:

The main frame 1 is formed, at the front, with a forwardly and upwardly inclined rigid, frame extension 10 which overhangs the rear portion of the draft frame 9, and a double-acting, fluid pressure power cylinder 11 is pivotally connected to the front end of the rigid frame extension 10 and thence extends at a forward and downward incline to connection with the draft frame 9.

At its front end the draft frame 9 includes a hitch 12 adapted to attach to the drawbar 13 of a tractor, indicated in part at 14.

The power cylinder 11 is included in a valve-controlled fluid pressure conduit system (not shown) which extends rearwardly from the tractor; extension of the power cylinder causing raising of the frames 1 and 9 at adjacent ends, while contraction of the power cylinder lowers said frames at said adjacent ends.

The draft frame 9 in the rear portion thereof is arched, as at 15, and the following plow and conveyor assembly is mounted in connection with such portion of the draft frame:

A plow unit 16, substantially the width of the frame and disposed to turn the soil laterally inwardly from the opposite sides of the plow unit, is suspended from the arch 15 by standards 17; there being coulters 18 which run ahead of the unit 16 in substantially longitudinal alinement with the sides of the latter. Each coulter 18 is carried on a standard 19. The plow unit 16 comprises a pair of right and left hand plows arranged in transversely alined and facing relation to each other, with a slight overlap at the rear. Each plow includes a vertical side plate 16a secured to the adjacent standard 17, the upper edge of the plate curving down from its rear end. Each plow includes a soil receiving plate 16b which at its outer side follows the curvature of the corresponding side plate 16a and at the rear curves transversely down so that the plow unit as a whole, while being horizontal at the bottom, has a concave curvature at the back, in a vertical plane, as shown in Fig. 4.

With the frames adjusted downwardly by the power cylinder 11 to the position shown in Fig. 1, the coulters 18 and the plows 16 run in the ground; the coulters cutting a longitudinal line on opposite sides of a strip which is subsequently dug and elevated by the plows 16 in the manner shown in Fig. 1.

From the plows 16 the strip of the dug soil, together with the roots and other foreign matter which may exist therein, is fed rearwardly onto the upper run of an endless lower conveyor 20; such conveyor being mounted in connection with the arch 15 by means including the cross shaft 7. Side walls 21 are disposed closely adjacent opposite sides of said conveyor 20.

The endless lower conveyor 20 includes a lower shaft 22, a lower roller 23, and an upper roller 24 on the cross shaft 7; the conveyor proper being an endless wire mesh belt 25.

The lower end of the lower endless conveyor 20 lies directly behind the plows 16, and thence such conveyor extends at a relatively sharp upward and rearward incline.

An endless upper conveyor 26 is disposed above the endless lower conveyor 20; such conveyor 26 including a lower run parallel to but spaced above the upper run of the endless lower conveyor 20.

The endless upper conveyor 26 includes a lower roller 27 on a cross shaft 28 and disposed in overhanging relation to the plows, and an upper roller 29 on a cross shaft 30; the conveyor comprising endless side chains 31 connected by a multiplicity of cross slats 32; certain of the latter having radially outwardly projecting spring tines 33 thereon. The conveyor 20 and 26 are driven, with the adjacent runs traveling upwardly and rearwardly, whereby the spring tines 33 aid the dug soil in its travel upwardly and rearwardly on said conveyor 20; the tines also tending to act to loosen the soil from the roots and other foreign matter which may be carried in such soil.

The conveyor 20 at its upper end delivers onto the top of a relatively fast-turning tumbling roller 34 mounted transversely in the forward, lower portion of the elongated, tunnel-like housing 4, such tumbling roller 34 being mounted on a cross shaft 35, and the periphery of the roller being fitted thereabout with angle irons 36 secured to said roller and extending the full width thereof. The angle irons 36 serve to jounce the soil delivered thereto from the conveyor 20, effectively loosening such soil from the embedded roots etc.

In turn, the tumbling roller 34, which is driven in the indicated direction, delivers the soil onto the forward end of the upper run of an elongated endless separator conveyor 37 which occupies the housing 4 for substantially its full length rearwardly of said tumbling roller 34.

The separator conveyor 37 includes end rollers 38 and 39 carried on cross shaft 40 and 41; the conveyor proper being an endless wire-mesh belt 42.

Intermediate the ends thereof the upper and lower runs of the separator conveyor 37 pass over idler rollers 43; the uppermost one of such idler rollers being carried on a vertically adjustable cross shaft 44.

The uppermost one of the idler rollers 43 is disposed at a relatively high point in the housing 4, whereby the forward portion 45 of the upper run of the separator conveyor 37 is disposed at a rearward and upward incline, and the rearward portion 46 of said run is disposed at a rearward and downward incline.

Adjacent but to the rear of the apex of the upper run of the separator conveyor 37, the top 2 is sharply upturned to form a strike plate 47, said top 2 being open for a distance ahead of said strike plate, but with the opening embraced by a hood 48.

The separator conveyor 37 travels at sufficient speed that soil on the upwardly and rearwardly inclined portion 45 is shown against the strike plate 47; the impact shaking the soil loose from the embedded roots etc., and the soil and other matter then falling back into the downwardly and rearwardly inclined portion 46.

Thus, the soil which has not previously shaken loose and escaped downwardly either through the conveyor 20 or the forward portion 45 of conveyor 37 does so through the portion 46.

The soil, as pulverized and freed from the roots and other debris, refills the furrow made by the plows 16, so that no open furrow is left and the level of the land is not materially disturbed.

At its rear end the tunnel-like housing 4 is fitted with a bottom discharge end deflector 49; the roots and other debris from the rear end of the separator conveyor 37 being discharged downwardly by said deflector, as at 50, windrowing on the ground rearwardly of the advancing implement. Such windrowed roots and debris can be readily raked into piles for burning, or removal from the field.

Escape of any of the material laterally from the separator conveyor 37 is prevented by the sides 3 on the main frame 1, while there are cooperating hoods 51 and 52 at the adjacent ends of said main frame 1 and draft frame 9; said hoods 51 and 52 each including side plates 53 and 54, respectively.

The hereinbefore described rotating mechanisms of the implement are driven from an engine 55 on a platform 56 mounted in connection with and supported above the arch 15 of draft frame 9. The engine 55 drives a countershaft 57 by means of an endless chain and sprocket unit 58. In turn, the countershaft 57 actuates the cross shaft 7 through the medium of an endless chain and sprocket unit 59. At the end of the cross shaft 7 opposite the endless chain and sprocket unit 59, said cross shaft 7 drives the cross shaft 28 of conveyor 26 by means of a reverse-drive belt and sprocket unit 60.

The cross shaft 40 of separator conveyor 37 is driven from cross shaft 7 by an endless chain and sprocket unit 61.

In turn, the cross shaft 35 of the tumbling roller 34 is actuated from cross shaft 40 by an endless chain and sprocket unit 62.

With respect to the above described driving mechanisms, the directions of rotation in each case is indicated by an arrow on the drawings.

In order to assure of proper frictional drive between the rollers 23 and 24 of the conveyor 20, and the endless wire-mesh belt 25, said rollers are formed—on the periphery and for the full width thereof—with axially spaced rubber drive rings 63; there being a matching scraper plate working in cooperation with the bottom of each of such rollers, and the scraper plate for said roller 24 being indicated at 64. Also, the rollers 38 and 39 of the separator conveyor 37 are constructed with rubber drive rings, as above described, in order to positively actuate the endless wire-mesh belt 42.

The described implement works smoothly, effectively, and positively to plow soil and sod from a field, and to thereafter pulverize the soil and redeposit it, while separating the roots and other debris for rear end discharge in a windrow.

The implement is designed for long use, with a minimum of servicing, maintenance, or repair being required; the structure being simple but rugged.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A soil pulverizing and root separating machine comprising a frame assembly which includes a forward draft portion arranged at its forward end to be supported at a fixed level, and a rear portion, a pivotal connection between the frame portions at their adjacent ends, a pair of wheels supporting the rear frame portion intermediate its ends so that it may swivel vertically about the pivotal connection, power means between the frame portions to control the swivel movement thereof, a plow unit mounted on the forward frame portion ahead of the pivotal connection, an endless driven conveyor mounted on said forward portion rearwardly of the plow unit to receive material as plowed up and elevate such material, driven separating devices mounted on the rear frame portion to receive material from the rear end of the conveyor, and an engine to drive the conveyor and devices mounted on the front frame portion above the plow unit whereby the weight of the engine exerts downward pressure adjacent said unit.

2. In a soil pulverizer and root separator, a mounting frame, an endless driven conveyor supported from the frame and whose upper run constitutes a dirt and material supporting surface, and a plow unit to dig and deliver such dirt and material to the conveyor, and disposed immediately ahead of the same to deliver thereto; said unit having upstanding side plates spaced apart substantially the width of the conveyor, said side plates sloping downwardly and forwardly from their rear end and the plow unit including a dirt engaging surface extending between the upstanding side plates from end to end thereof and at its sides following the contour thereof and at its rear end being concavely curved from side to side; the plow unit comprising separate transversely alined plows arranged in facing overlapping relation to each other at their rear end.

References Cited in the file of this patent

UNITED STATES PATENTS

| Number | Name | Date |
|---|---|---|
| 1,018,513 | Meyer | Feb. 27, 1912 |
| 1,044,860 | Cole | Nov. 19, 1912 |
| 1,245,252 | McGregor | Nov. 6, 1917 |
| 1,494,458 | Campbell | May 20, 1924 |
| 1,500,437 | Burton | July 8, 1924 |
| 1,764,791 | Ingle | June 17, 1930 |
| 1,771,025 | Barry | July 22, 1930 |
| 1,776,419 | Dodge | Sept. 23, 1930 |
| 1,802,211 | Lively | Apr. 21, 1931 |
| 1,864,382 | Twentyman | June 21, 1932 |
| 2,060,688 | Pryor et al. | Nov. 10, 1936 |
| 2,282,679 | Smith | May 12, 1942 |
| 2,309,203 | Morkoski | Jan. 26, 1943 |
| 2,523,024 | Jenkins | Sept. 24, 1950 |
| 2,559,965 | Innes | July 10, 1951 |
| 2,569,201 | Smith | Sept. 25, 1951 |
| 2,578,189 | Johnston | Dec. 11, 1951 |
| 2,635,888 | Bailiff | Apr. 21, 1953 |